(12) United States Patent
Alger et al.

(10) Patent No.: US 7,574,483 B1
(45) Date of Patent: Aug. 11, 2009

(54) SYSTEM AND METHOD FOR CHANGE MANAGEMENT PROCESS AUTOMATION

(75) Inventors: James Alger, Coral Springs, FL (US); Frank J. Gvalog, Ft. Lauderdale, FL (US); Lora Wright, Hollywood, FL (US); Rajesh Arora, Weston, FL (US); Rejesh N Rajasekhar, Weston, FL (US); Shailendra Varma, Pembroke Pines, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 739 days.

(21) Appl. No.: 10/905,201

(22) Filed: Dec. 21, 2004

Related U.S. Application Data

(60) Provisional application No. 60/522,348, filed on Sep. 17, 2004.

(51) Int. Cl.
G06F 15/16 (2006.01)
G06F 12/00 (2006.01)
(52) U.S. Cl. .......................................... 709/217; 707/10
(58) Field of Classification Search ................. 709/217, 709/218, 223–226, 229; 707/10
See application file for complete search history.

(56) References Cited

U.S. PATENT DOCUMENTS

| | | | | |
|---|---|---|---|---|
| 5,778,378 A | * | 7/1998 | Rubin | 707/103 R |
| 6,381,579 B1 | * | 4/2002 | Gervais et al. | 705/8 |
| 6,493,749 B2 | * | 12/2002 | Paxhia et al. | 709/220 |
| 6,701,376 B1 | * | 3/2004 | Haverstock et al. | 709/246 |
| 6,956,845 B2 | * | 10/2005 | Baker et al. | 370/352 |
| 2005/0047645 A1 | * | 3/2005 | Funk et al. | 382/145 |
| 2006/0004821 A1 | * | 1/2006 | Bhasker et al. | 707/101 |

OTHER PUBLICATIONS

Bhasker et al., Method and System for Web-Based Enterprise Change And Configuration Management Reports, May 21, 2004 Provisional Application, pp. 1-6.*

* cited by examiner

*Primary Examiner*—Zarni Maung
(74) *Attorney, Agent, or Firm*—Fitzpatrick, Cella, Harper & Scinto

(57) ABSTRACT

The invention enables an enterprise to manage changes to computing infrastructure through an online change management system. The invention enables authorized users to logon to the system, view a personal and holistic calendar, create reports, modify change management records, attach files or other artifacts to change management records. The invention also provides business rules which can be employed online for service which then invokes various system components to create a workgroup and workflow according to predefined business rules.

14 Claims, 7 Drawing Sheets

US 7,574,483 B1

SYSTEM AND METHOD FOR CHANGE MANAGEMENT PROCESS AUTOMATION

CROSS-REFERENCE TO RELATED APPLICATIONS

This application claims priority to, and the benefit of, U.S. Provisional Application Ser. No. 60/522,348 filed Sep. 17, 2004 and entitled "Change Management System and Method", which is hereby incorporated by reference.

FIELD OF INVENTION

This invention generally relates to the automation of change management processes for projects, wherein projects may involve a number of varying personnel and computing assets, and more particularly, to a system and method for retrieving planning and execution activities relating to change management from a SQL server, wherein activities are auto-fed from a mainframe system to the SQL server.

BACKGROUND OF INVENTION

Change management is most often associated with maintaining a computer infrastructure within an organization including changes to both hardware and software. As organizations and technology evolve, there is most often a need modify and/or augment existing computing infrastructure. Change management is the process of tracking and monitoring changes in order to maintain control and understand the technical progress toward delivering an acceptable end-user product. For example, a company having three employees may use and manage employee schedules within a spreadsheet such as those provided by Microsoft Excel. However, as the company grows and employees are hired, the spreadsheet may no longer be sufficient. Therefore, the company may either purchase or create new software with the sophistication required to manage a growing number of employee schedules. The actual process of migrating to a new solution may not be very complex; however, to ensure the integrity of the existing data, the process should be carefully planned and monitored, while maintaining the original artifact. There are often many other factors to consider when managing change, especially when the change has a high risk factor and/or the business value of the existing infrastructure is high.

Many organizations implement change management in different ways. Off-the-shelf software products, books and best practices have been authored by software companies, consortiums and educators to help organizations implement better change management policies. It has become increasingly important for organizations to adopt sound change management practices, as the cost associated with losses of systems and data due to unforeseen problems during change has risen proportionally with the reliance on computers and electronic information. Maintaining accurate records regarding change events typically constitutes a large part of change management. Records enable information systems specialists to diagnose problems and restore systems and data in a timely manner in the project that one or more systems or databases are lost due to a change within the infrastructure. Moreover, for organizations with established change management databases in a mainframe environment, it is often difficult to present change management information to the user in a web browser for online viewing.

Therefore, a need exists for a system and method for providing online access to change management activities where change management records and data may be stored within a mainframe computing environment. Further, a need exists to provide an interface wherein members of an enterprise may submit requests for service which would invoke computing logic and business rules to create a suitable workgroup and workflow. Further still, a need exists for a system and method for creating and maintaining repeatable practices to ensure efficiency, consistency and quality of projects and/or products resulting from requests for service.

SUMMARY OF INVENTION

The invention includes a robust and responsive system for managing change to a computing infrastructure within an enterprise. In one embodiment, the invention includes a portal (e.g., web-based application—net architecture) that facilitates planning implementations for development and production support teams for change management activities. The Change Management Portal (CMP) may be available to all technology teams and can be used by the different groups and their business partners to automatically capture change management records from a mainframe computer and use the system to proactively manage planned changes holistically and mitigate risk to key stakeholders.

The system facilitates review by implementation teams of pre-planned changes that are scheduled on a periodic (e.g., daily, weekly and monthly) basis. Using the invention, teams have the flexibility to view individual changes that are planned, or select a group of teams to gather a holistic view of changes that may impact a utility or changes within their teams. The tool also allows business partners (e.g., System Assurance partners) to automatically validate and approve changes prior to being implemented into the production environment. E-mail notification of approvals may be included as an alert built into the tool, as well, as notification of those changes that may have failed certain criteria for implementations.

The invention may also provide the functionality to display reports on the data based on user preferences. A holistic calendar including, for example, the information from all or any subset of the different groups may additionally be provided.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for providing online access to change management events within a distributed information technology environment. A change management system (CMS) 110 may instantiate a number of hardware and software components to optimally maintain change management records and enable users to access calendars and reports while providing a means for ensuring that artifacts are maintained.

Figure 1:
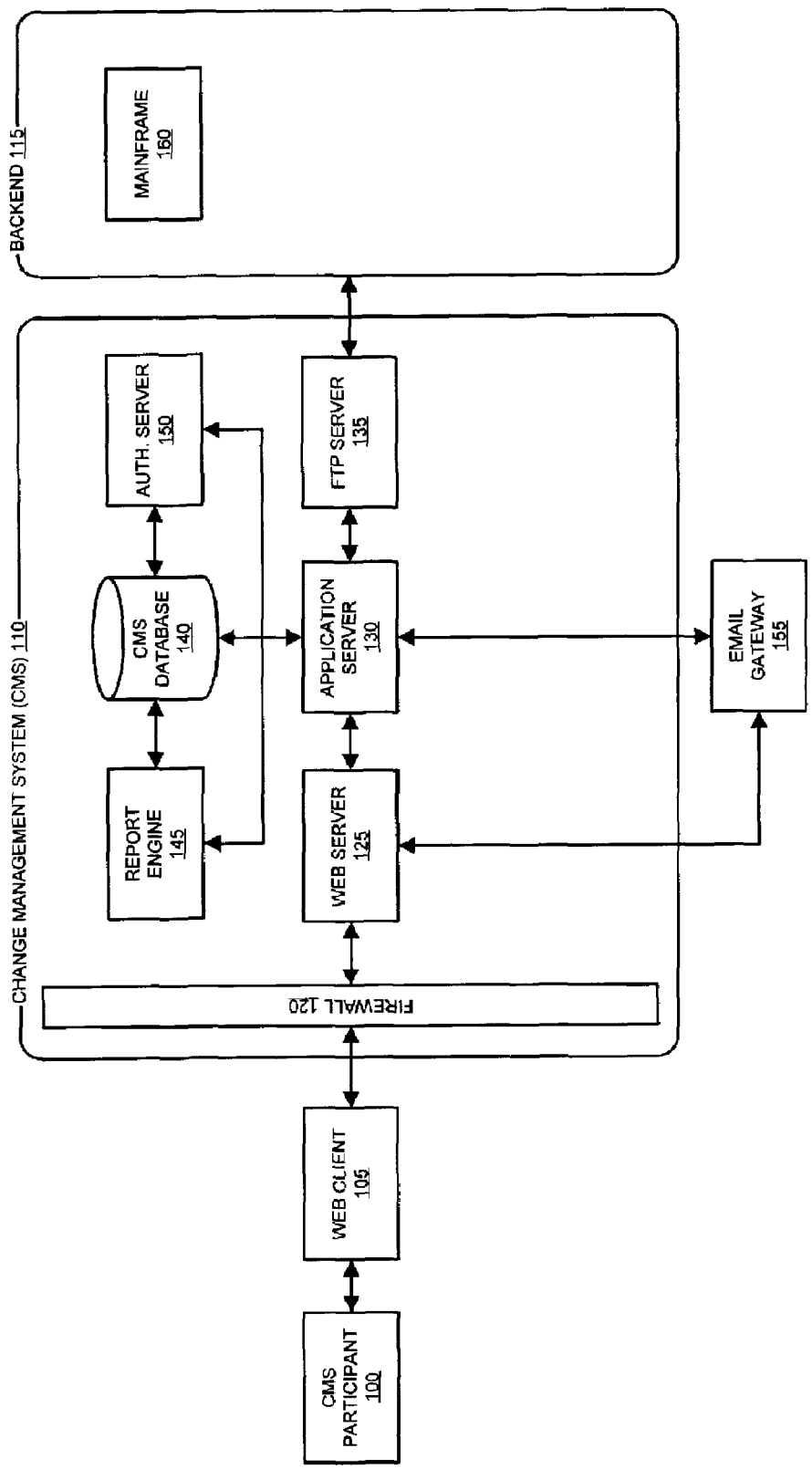
FIG. 1 is a block diagram illustrating exemplary major system components for a change management system.

CMS 110 contains various hardware and/or software components suitably configured to maintain all or any portion of information associated with a change management task. After proper authorization, CMS 110 may allow users to view and modify records and documents associated with a change management event. CMS 110 may apply appropriate predefined business rules to allow varying levels of access to change management records. In one embodiment, with reference to FIG. 1, CMS 110 may include a firewall 120, a web server 125, an FTP server 135, an application server 130 in communication with a CMS database 140, an authentication server 150 and a report engine 145. External entities may include a CMS participant 100 interacting with CMS 110 through a web client 105 and an email gateway 155. In one embodiment, CMS 110 may further interact with any number of backend computing devices such as, for example, a change management mainframe.

As will be appreciated by one of ordinary skill in the art, the invention may be embodied as a customization of an existing system, an add-on product, upgraded software, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Referring again to FIG. 1, a CMS participant 100 may include any individual, business, entity, software and/or hardware that interacts with CMS to implement change management controls. Changes may include, for example, software upgrades and/or hardware upgrades, software and/or hardware modifications, changes to a database, database re-configuration and the like. A CMS participant 100 may be an employee, contractor, or any other authorized third party working in the interest of the enterprise. For example, a CMS participant 100 may be a consumer of computing resources such as an accountant in need of additional analysis reports in order better control personnel expenditures. CMS participant 100 may also be a practitioner who is responsible for executing a change. For example, a database administrator may interact with CMS 110 to view change management activities affecting him and the administrator may record details regarding database modifications within CMS 110. Those skilled in the art will appreciate that the departmental structure of the enterprise does not affect the scope of the invention. For example, the invention may be implemented within a corporation comprising any number of departments and an Information Technology department. The invention may enable members from any number of departments to access CMS 110 to submit a change management request. In another embodiment, a corporation may outsource some or all of its IT functions to a contractor. As such, a change management activities may be routed to a CMS of a contractor.

A CMS participant 100 may interact with CMS through a web client 105. A web client 105 may comprise computing units or systems which may take the form of a computer or set of computers, although other types of computing units or systems may be used, including laptops, notebooks, hand held computers, set-top boxes, workstations, computer-servers, main frame computers, mini-computers, PC servers, network sets of computers, and/or the like. Further, any computing device discussed herein may also be a "pervasive computing device," which may include a traditionally non-computerized device that is embedded with a computing unit. Examples can include, for example, watches, Internet enabled kitchen appliances, restaurant tables embedded with RF readers, wallets or purses with imbedded transponders, etc.

The computing unit of the web client 105 may be further equipped with an Internet browser connected to the Internet or an intranet using standard dial-up, cable, DSL or any other Internet protocol known in the art. Transactions originating at a web client 105 may pass through a firewall 120 in order to prevent unauthorized access from users of other networks. Further, additional firewalls 120 may be deployed between the varying components of CMS 110 to further enhance security.

Firewall 120 may include any hardware and/or software suitably configured to protect CMS 110 components and/or enterprise computing resources from users of other networks. Further, a firewall 120 may be configured to limit or restrict access to various systems and components behind the firewall 120 for web clients 105 connecting through a web server 125. Firewall 120 may reside in varying configurations including Stateful Inspection, Proxy based and Packet Filtering among others. Firewall 120 may be integrated within an web server 125 or any other CMS 110 components or may further reside as a separate entity.

Web server 125 may include any hardware and/or software suitably configured to serve web pages and data to a connected web client 105. Web server 125 may communicate with any number of other servers, databases or components through any means known in the art. Web server 125 may serve as a conduit between web clients 105 and the systems and components of CMS 110. Web server 125 may interface with an application server 125 to instantiate appropriate applications and business logic to process web client requests.

Applications server 130 may include any hardware and/or software suitably configured to serve applications and data to connected web clients 105. Like the web server 125, application server 130 may communicate with any number of other servers, databases and/or components through any means known in the art. Further, application server 130 may serve as a conduit between the web server 125 and the systems and components of CMS 110. As presented herein, CMS participant 100 may interact with application server 130 through an Internet and/or intranet connection. However, those skilled in the art will appreciate that a CMS participant 100 may interact with application server 130 through any communications protocol known in the art or discussed herein, including a Local Area Network (LAN), for example.

FTP server 135 may include any hardware and/or software suitably configured to facilitate uploading or downloading of files to and from remote computer systems on a network using TCP/IP, such as the Internet. FTP server 135 may receive a request from application server 130 to batch download CM files from mainframe 160 that may maintain such files.

Authentication server 150 may be invoked by an application server 130 in response to submission of a user's authentication credentials received at web server 125. Authentication server 150 may include any hardware and/or software suitably configured to receive authentication credentials, encrypt and decrypt credentials, authenticate credentials, and grant access rights according to the user's pre-determined privileges attached to the credentials. Authentication server 150 may grant varying degrees of application and data level access to CMS 110 users based on user information stored within CMS database 140. For example, a user who is a company employee may be limited to checking the status of a change management event. However, a manager of an IT workgroup, may be allotted access to view additional information and modify change management events.

CMS database 140 may include any hardware and/or software suitably configured to facilitate storing information relating to security and change management events. Such information may include registration information, authentication credentials, access privileges, audit logs, reports, calendar entries, artifacts and the like. One skilled in the art will appreciate that CMS 110 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); binary large object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a binary large object (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, provider, issuer, user or the like. Furthermore, the security information may restrict/permit only certain actions such as accessing, modifying, and/or deleting data sets. In one example, the data set annotation indicates that only the data set owner or the user are permitted to delete a data set, various identified providers are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. user computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant in the present invention may be equipped with a computing device in order to interact with CMS 110. As previously described, the RFS participant 100 and RFS administrator 105 may each have a computing unit in the form of a personal computer, although other types of computing units may be used including laptops, notebooks, hand held computers, set-top boxes, cellular telephones, touch-tone telephones and the like. In one embodiment, the internal client may have a computing unit implemented in the form of a computer-server, although other implementations are contemplated by the invention. CMS 110 as shown may comprise one or more mainframe computers. However, CMS 110 may be implemented in other forms, such as a mini-computer, a PC server, a network of computers located in the same of different geographic locations, or the like. Moreover, the system contemplates the use, sale or distribution of any services or information over any network having similar functionality described herein. The system may incorporate loyalty points or loyalty systems into any portion of the process.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Referring now to FIGS. 2-7, the process flows depicted are merely exemplary embodiments of the invention and are not intended to limit the scope of the invention as described herein. For example, the steps recited in any of the method or process descriptions may be executed in any order and are not limited to the order presented. It will be appreciated that the following description makes appropriate reference to not only to the steps depicted in FIGS. 2-7, but also to the various system components as described above with reference to FIG. 1. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Figure 2:
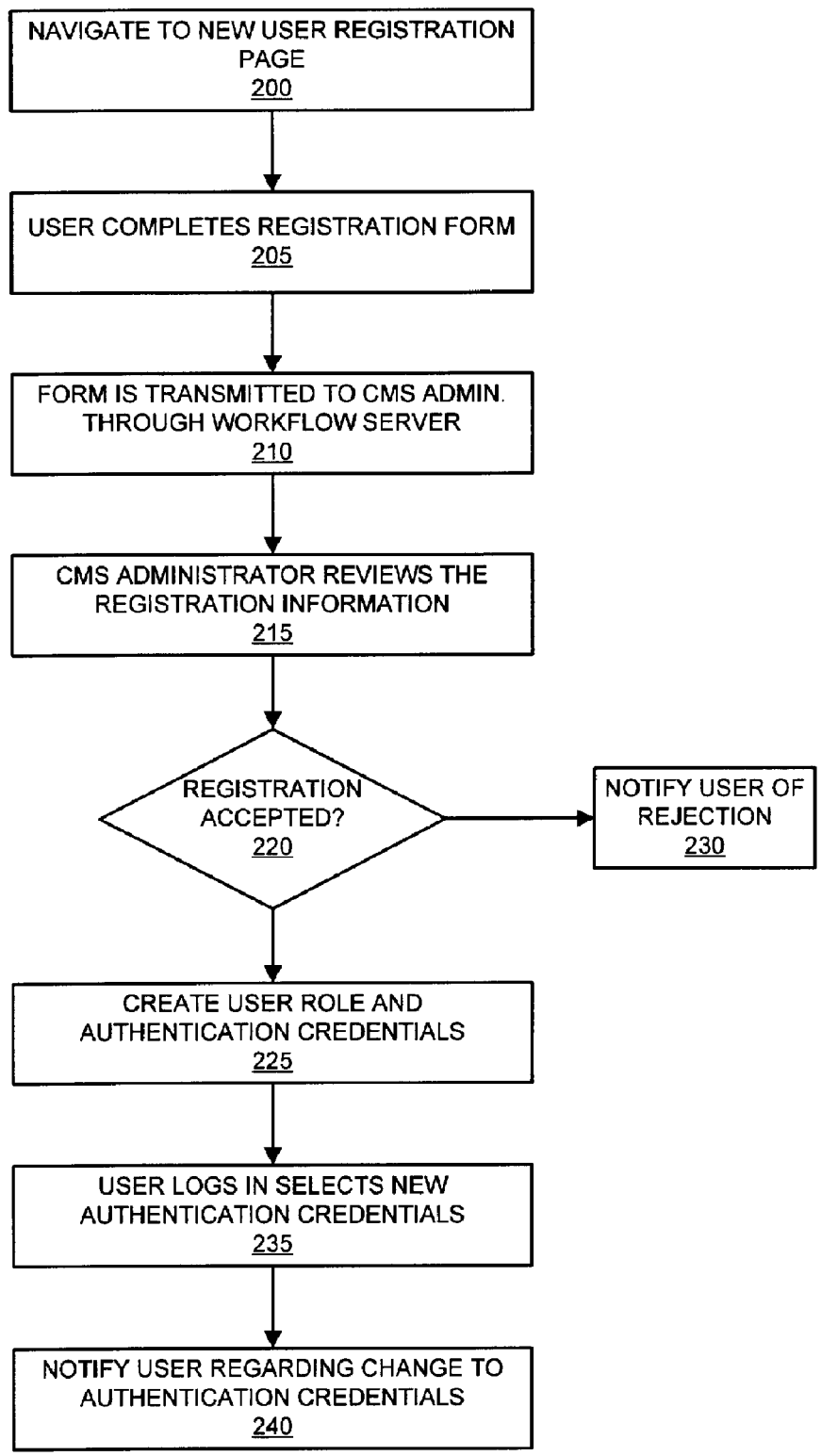
FIG. 2 is a flow chart illustrating an exemplary registration process wherein users may establish authorization to use the system of the invention.

FIG. 2 is a flow chart illustrating an exemplary registration process wherein users may establish authorization to use the system of the invention. A user wishing to participate in CMS 110 may navigate to a new user registration page (step 200). A new user may be presented a web form with various fields for which the user may be prompted to enter desired or required information to complete the registration form (step 205). A registration form may include information which may be used to determine a user's eligibility and verify the registrant's identity. For example, a employee may be required to enter her name, business unit, department, supervisor's name, social security number, employee identification, etc.

Upon completing the registration form, the user may select a link to submit the form. The form may be transmitted to a CMS system administrator through application server (step 210). The process by which a form is transmitted and routed to CMS administrator may include, for example, the form transmitted from the web client 105 passing through a firewall 120 to web server 125. At web server 125, an application may be invoked on application server 130 to parse and store the data in CMS database 140. A second application may be invoked on application server 130 to format all or a portion of the data and apply business rules to determine who should review and approve the registration form. When the appropriate person, software and/or hardware is identified, application server 130 may format the data into an email message and transmit the email to an email gateway 155. Email gateway 155 may then transmit the formatted email message to web server 125 where it may be received from a connecting CMS system administrator.

The above process flow relating to the transmittal of a registration form from the user to the appropriate CMS 110 components has been presented for better understanding of the overall process. Practitioners will appreciate the invention may contemplate any number of steps which may be re-arranged, added or removed to the process.

A registration form that has been submitted by a user and routed through CMS 110 may be made available to a CMS system administrator for review (step 215). CMS system administrator may review the registration information for accuracy and ensure that the registrant is properly authorized to use CMS 110 as governed by company policy. The authorization may be manual or an automatic comparison against various rules. CMS system administrator may review any number of registration forms, as one or more forms may have been added to his task list by the application server 130 as previously described. If CMS system administrator chooses not to accept a registration form for any reason, the administrator may do so by selecting a "Reject" hyperlink, for example. The reject link may generate a command and application server 130 may invoke an application to remove the registration data from CMS database 140. Further, the pending registration form may be removed from CMS system administrator's task list. An email notification specifying the reason for a rejected registration may be generated and sent to the user (step 225).

When CMS system administrator accepts a registration (step 220), she may create user roles based on the registrant's position within an enterprise and temporary authentication credentials. According to an embodiment, users may be designated specific roles within a workgroup. For example, a software tester may be designated the role of "quality assurance". As a project moves through a workflow, business rules may determine which members of a workgroup should receive instructions to proceed with defined tasks. Therefore, when a software development workgroup member completes development of a software module, the business rules may map the project to a quality assurance workgroup member in order to test the software module. When a user has been assigned one or more roles, the assignment may require changes to one or more business rules. The role assignment may be transmitted to web server 125 which may invoke an application in applications server 130. The application may format and modify related business rules and store and/or update information in CMS database 140.

In another embodiment, CMS system administrator may interact with a user interface in order to create new roles, modify existing roles, and create or modify business rules to apply to roles. If a change management project relates to a software product, for example, there may be requirements that are unique based on the nature of the project. A CMS system administrator may determine that a project requiring outside resources should be reviewed by the legal department to ensure that confidentiality conflicts do not arise. CMS system administrator may create a new role, "legal review" and assign it to a member of the legal department. Creation of a related business rule may ensure that a requested change is routed to the person assigned the role of "legal review" and define what actions will follow an approval or disapproval action.

CMS system administrator may also create new authentication credentials for an approved user (step 130). Authentication credentials may enable a new user to log into CMS 110 for the first time. The authentication credentials may be communicated to the user through any means known in the art or discussed herein including, for example, email, telephone, personal contact and the like. When a new user receives CMS system administrator issued authentication credentials, the user may connect to CMS 110 and log in using the credentials. The user may then be requested to select new authentication credentials (step 235) to preserve system security and integrity. When the user selects and enters new authentication credentials, the entry may be transmitted to the web server 125 which may invoke a security application on the applications server 135. The security application 135 may then validate the format of the authentication credentials and save them to the database 150 if they are properly validated. CMS 110 may then generate an email to be sent to the user to verify the changes to the registration (step 240).

Figure 3:
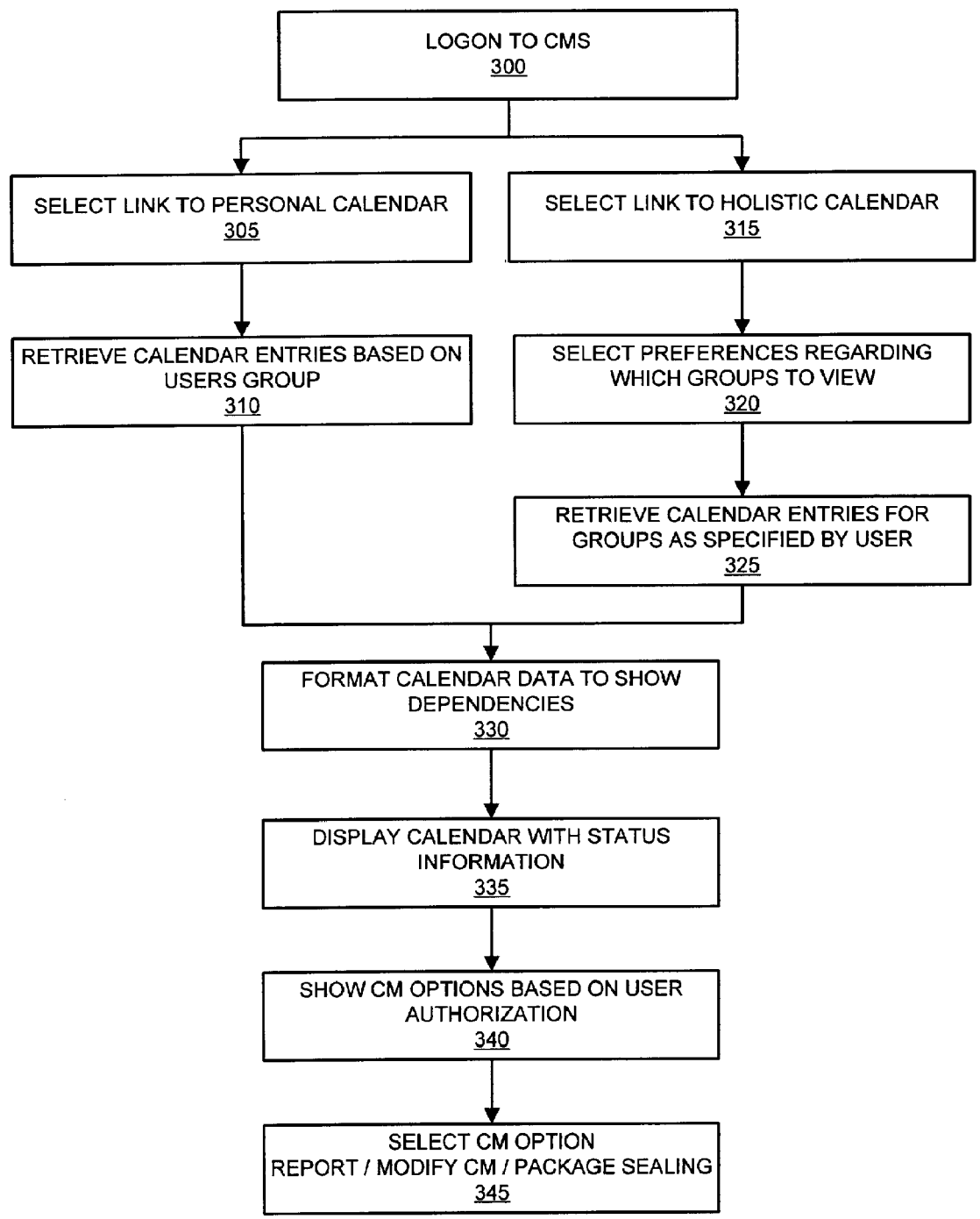
FIG. 3 is a flow chart illustrating an exemplary process for viewing change management calendars on either of two views.

FIG. 3 is a flow chart illustrating an exemplary process for viewing change management calendars on either of two views. In an exemplary embodiment, a user may log into CMS 110 using a web interface in connection with a web server 125 through a secure intranet. However, those skilled in the art will appreciate that other networking modes may be equally applicable. Following authorization, a CMS participant 100 may select a webpage link to view either a personal calendar (step 305) of a holistic calendar (step 315). Each calendar will be described in greater detail herein.

Information relating to the calendars and reports of the invention, may originate at the mainframe. An administrator may configure CMS 110 to invoke FTP in order to upload data into flat files from the mainframe 160. This may be completed at pre-defined intervals in order to maintain the integrity and accuracy of the information. Data may be extracted from the flat files and inserted into a database using a tool such as SQL Server Data Transfer. Practitioners will appreciate that other software and/or database tool may be used as well.

A personal calendar may provide CMS participants 100 with views of all or any portion of change management events relating to the participant's group membership. Further, the personal calendar may provide real-time status of change events and access to change project associations. Associations may include any related document or files such as, for example, specifications, charts, a Microsoft Project file, schedules, source code, database schemas and the like. CMS database 140 may be queried for all calendar entries relating to CMS participant's 100 group (step 310). For example, a CMS participant 100 may been defined within CMS database 140 as being a member of the Automation Technologies group and therefore, may only be allowed to view change calendars relating to the Automation Technologies group. The personal calendar may be presented in any number of configurations. In one embodiment, CMS participant 100 may set preferences in order to control the particular view of the personal calendar. Further, CMS participant 100 may select a date range in order to view specific change events. Practitioners will appreciate that calendar data may be presented in any number of configurations.

A holistic calendar may provide a view of change management events for any two or more groups as well as descriptions of the change events and status. Further, the holistic calendar may show inter dependencies between two or more change events. Based on CMS participant's 100 selection, the holistic calendar may have functionality to display all changes executed by all groups or selected groups or to view changes of a particular type executed by selected groups. For example, CMS participant 100 may choose to view all medium to high impact changes executed by selected groups within a given date range.

Following selection of a link to view a holistic calendar (step 315), CMS participant 100 may be provided a webpage from which to select preferences regarding which groups to view (step 320). As discussed previously, a user may also be presented with various other calendar preferences such as, for example, change types, date ranges, viewing preferences and the like. Preferences in the form of a request may be transmitted to CMS 110 in order to retrieve the calendar entries relating to the selected groups (step 325).

When CMS 110 retrieves calendar entries, application server 130 may invoke appropriate applications and business rules to format the calendar data to show dependencies (step 330). Dependencies may result between two or more change events when a change to one may affect the other. For example, a change project such as reconfiguring a portion of a LAN may be dependent on the installation of new networking software on a server. Therefore, business logic may be employed to determine dependencies to be included within a calendar. Practitioners will appreciate that dependencies may be displayed graphically or within the arrangement of the information itself.

Further, calendar entries may contain different information, which may be useful in describing the change management project. The invention may employ business rules to enforce uniformity in change management project descriptions. For example, various groups and/or departments within an organization may use varying descriptions to describe systems, applications, processes, procedures and the like. In order to maintain uniformity across an enterprise, CMS 110 may invoke business rules to ensure that a description as entered in Accounting will be consistent with a description as entered by Engineering, for example. Practitioners will appreciate that any number of methods may be employed to create standardized change management project descriptions such as, for example, the use of a number of lookup tables within a database.

Retrieved and formatted calendar entries may then be transmitted to the web client 105 to be displayed within a webpage (step 335). Based on the authorization of CMS participant 100, CMS 110 may provide change management options (step 340). Such options may include, for example, the selection of reports based on one or more calendar entries, modification of a change management event, package sealing, and the like. Package sealing refers to a procedure whereby a complete change package has gone through prerequisite testing and has been sealed to ensure that what has been tested and signed is not migrated into production. The user may select from one of any number of change management options (step 345).

Figure 4:
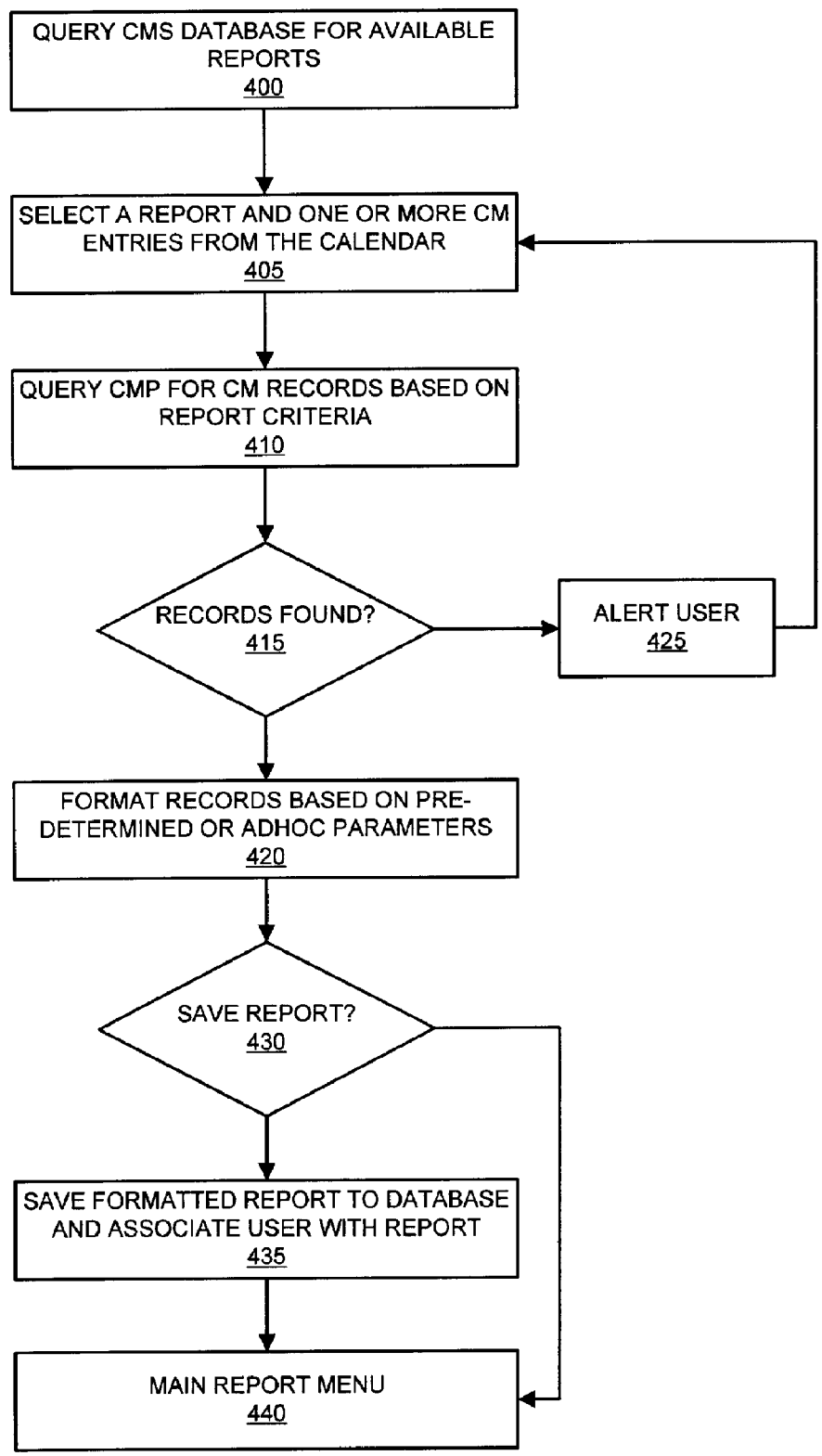
FIG. 4 is a flow chart illustrating an exemplary process for selecting and viewing change management reports within a change management system.

FIG. 4 is a flow chart illustrating an exemplary process for selecting and viewing change management reports within a change management system. Reports may provide CMS participant 100 with a number of different views of change management information. Pre-configured reports may be stored in CMS database 140 where they may later be retrieved (step 400). A CMS participant 100 may view available reports within a list or any other means known in the art. Upon selecting one or more calendar entries, CMS participant 100 may select a report (step 405). Based on selected report and calendar entries, a query may be constructed and sent to CMS database (step 410). If no records are found matching report criteria, then CMS 110 may alert the user (step 425) and again present them with webpage from where they may select a report and one or more change management calendar entry (step 410).

If one or more records are returned from CMS database 140, then a report engine 145 may format the records according to the selected report (step 420). In one embodiment, a CMS participant 100 may create ad-hoc reports to compile custom reports according to specialized needs. Through a web interface, a CMS participant 100 may select which database fields to include in a report, the positioning of the selected fields, define equations, etc. After running a report, a CMS participant may be prompted to save the report (step 430). If the report is a pre-configured report, the report parameters may be saved along with data included in the report (step 435). In one embodiment, if a report has been created ad-hoc, CMS 110 may save the report definition to CMS database where it may be made available for other CMS participants 100. After saving (step 435) or choosing not to save the report (step 430), CMS participant 100 may be presented with the main report menu (step 440) where another report may be selected.

In another embodiment, the invention may calculate statistical information relating to the execution and implementation of a change management event. CMS 110 may employ computing logic and/or business rules to calculate any number of statistics, which may be useful in a number of ways. For example, the invention may track the success rate for a number of change management events to create a Six Sigma calculation. The invention may create any number of calculations based on any number or set of numbers relating to the change management process. Calculations may be incorporated into reports which may be used to help improve the process as well as provide greater insight into how efficient and effective change management is being executed within an enterprise.

Figure 5:
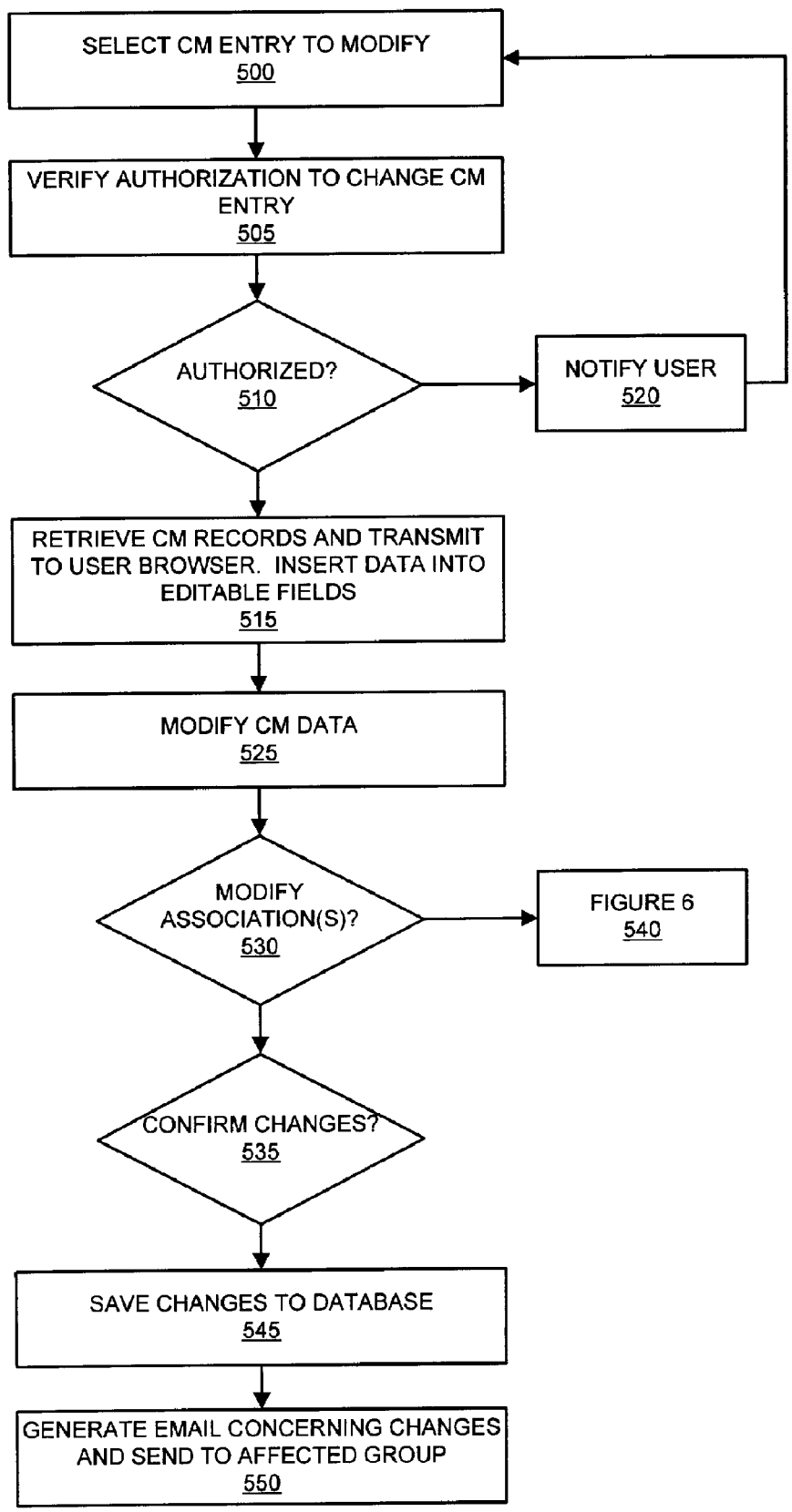
FIG. 5 is a flow chart illustrating an exemplary process for modifying a change management event.

FIG. 5 is a flow chart illustrating an exemplary process for modifying a change management event. It may be desirable or necessary to modify change management records and associations, therefore the invention may provide an interface to enable a CMS participant 100 to select a change management project to modify from a calendar (step 500). To ensure that only authorized individuals edit change management events, CMS 110 may verify that the current user is authorized to do so (step 505). Further, varying levels of modify privileges may be assigned. For example, a department manager may be authorized to modify change management events relating to her department only, while IT department manager may be authorized to modify all change management events. If CMS participant 100 is not authorized to modify the selected change management event, then they may be notified as such (step 52) before being redirected to make another selection (step 500).

If CMS participant 100 is authorized to modify a selected change management project then, at least a portion of one or more records relating to the selection may be retrieved from CMS database 140. The records may be parsed before being transmitted to web client 105 where editable data may be inserted into webpage fields (step 515). CMS participant 100 may perform edit, add and delete change management project data within the webpage fields (step 525). For example, an assigned group may be modified within a drop-down menu, where the menu is populated with the names of all available groups.

In addition to modifying change management project record content, there may be a need to modify associations. As discussed above, associations may include, for example, any documents, schemas, Unified Modeling Language files (UML), programming code modules, applications and the like. A change management project may have one or more associations that are relevant to the change activities, therefore an authorized CMS participant 100 may modify the associations as may be required. If one or more associations are to be edited, added, or deleted (step 530), then CMS participant 100 may be presented an interface from which to view and modify current associations as will be discussed in greater detail in reference to FIG. 6 (step 540).

If modification of the change management record(s) are complete and no associations are to be modified, then CMS participant 100 may be prompted to review and confirm the changes (step 535). If the changes are not confirmed, then the changes are not transmitted to CMS 110 and CMS participant 100 may be presented with a webpage to select a change management project to modify. However, if the changes are confirmed, then the modified records may then be transmitted to CMS 110 where modified data may be integrated with other data prior to being saved to CMS database (step 545). The applications server 130 may invoke an application such as an email client to generate an email message containing information such as the data that was changed, the date of the change, CMS participant 100 responsible for the change and the like. In another embodiment, the system may simply generate an email message stating that changes where made along with a link to view the changes. The generated email may be transmitted to email gateway 155 and sent to all member of the affected one or more groups (step 550).

Figure 6:
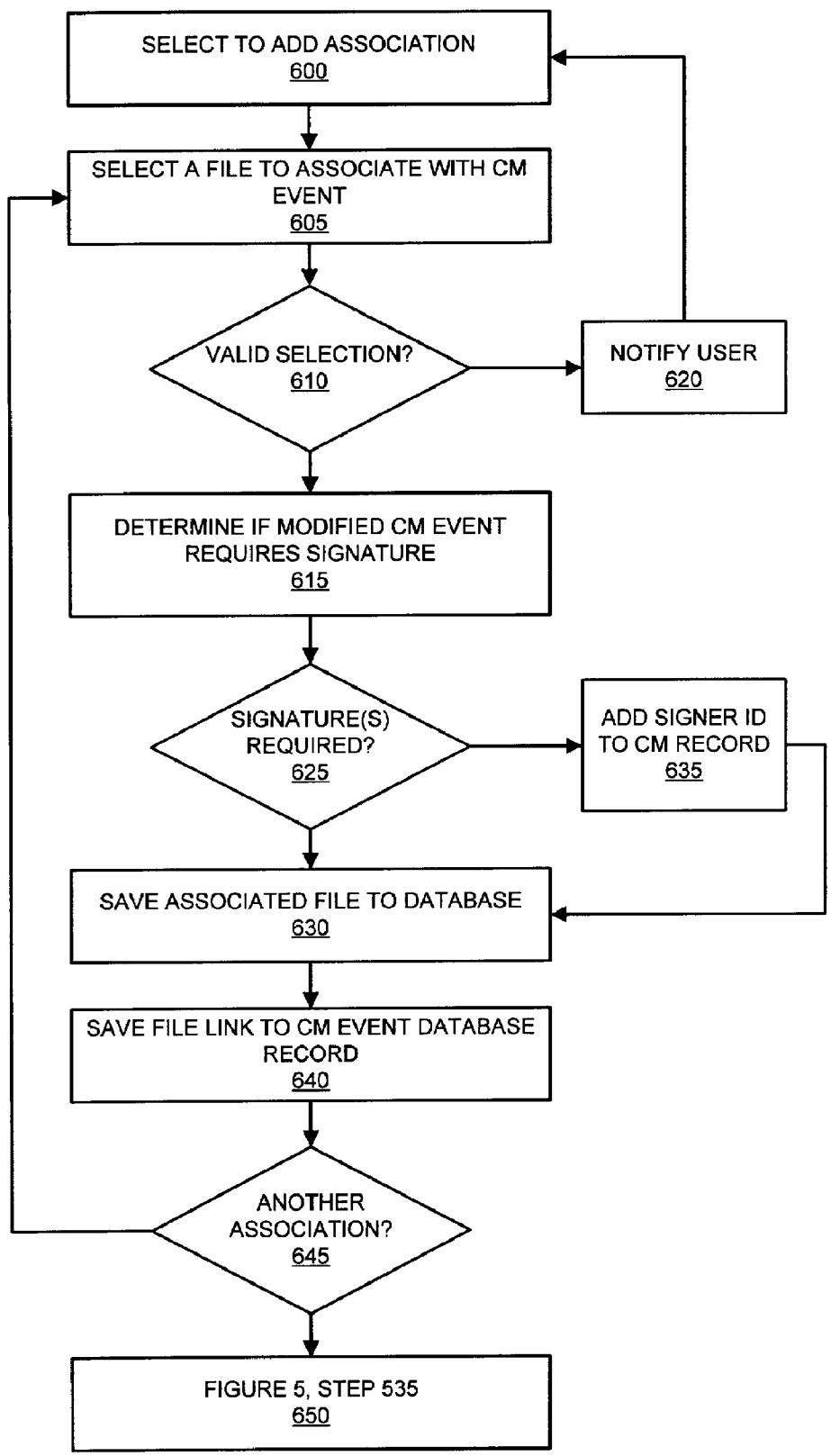
FIG. 6 is a flow chart illustrating an exemplary process for adding one or more associations to an existing change management event; and, FIG. 7 is a flow chart illustrating an exemplary process for authorizing a change management project and progressing it along a signature queue.

FIG. 6 is a flow chart illustrating an exemplary process for adding one or more associations to an existing change management event. As discussed in reference to step 530 of FIG. 5, authorized CMS participants 100 may modify change management project associations. Associations may comprise any file and/or artifact associated with the change management event. If in step 535 of FIG. 5, a CMS participant 100 needs to modify one or more associations, may be presented with a webpage or interface listing existing associations for the selected change management event. While FIG. 6 is directed toward adding associations, practitioners will appreciate that similar steps may be followed to modify or delete associations.

A CMS participant 100 may select a button or link to add a new association (step 600). In one embodiment, the invention may employ a standard "open" dialog as is common in the Microsoft Windows environment. CMS participant 100 may navigate any number of memory structures in order to locate the desired file, or alternatively, type the file address in a text box. When the appropriate file is located, CMS participant 100 may select the file (step 605). CMS 110 may employ business logic to determine if a selected file is valid or appropriate to associate with a change management event. If the selected file is not valid (step 610), then CMS participant 100 may be alerted (step 620) and again presented with an opportunity to add an association (step 600). If the selected file is valid, then CMS 110 may determine whether the added association requires the change management project to obtain approval.

Determining whether added associations necessitate additional signature authorization may be accomplished through business rules that define what change management project types require signature and what types of modifications require additional sign-off (step 615). If a signature is required, business rules may define what level of signature is required for any one or more signers. CMS database 140 may be queried in order to retrieve the identification of the signer(s) based on the level required according to the business rules. The appropriate signer(s) may then be added to the change management project (step 635). In one embodiment, determination that one or more signatures are required may restrict further access to the change management project until the one or more signatures are obtains. In another embodiment, the change management project may remain accessible with notice added that the present change management project is pending authorization.

Whether or not a signer is added to a change management event, the selected file may be uploaded to CMS 110 where it may be stored within a database or as a file on a memory drive (step 630). One skilled in the art will appreciate that uploading or downloading a file over the Internet is typically through FTP, however other transfer protocols may be equally effective. In order to maintain a link to an uploaded file, a link (or address) of the selected association may be saved with the change management project in CMS database (step 640).

A CMS participant 100 may choose to add additional associations to a change management event. If this is the case (step 645) then the user may be prompted to select another file to associate with the selected change management project (step 605). If there are no additional files to add, then CMS participant 100 may be returned to a change management project modification page (step 650) to confirm the changes (FIG. 5, step 535) and save the changes to CMS database (FIG. 5, step 545).

Figure 7:
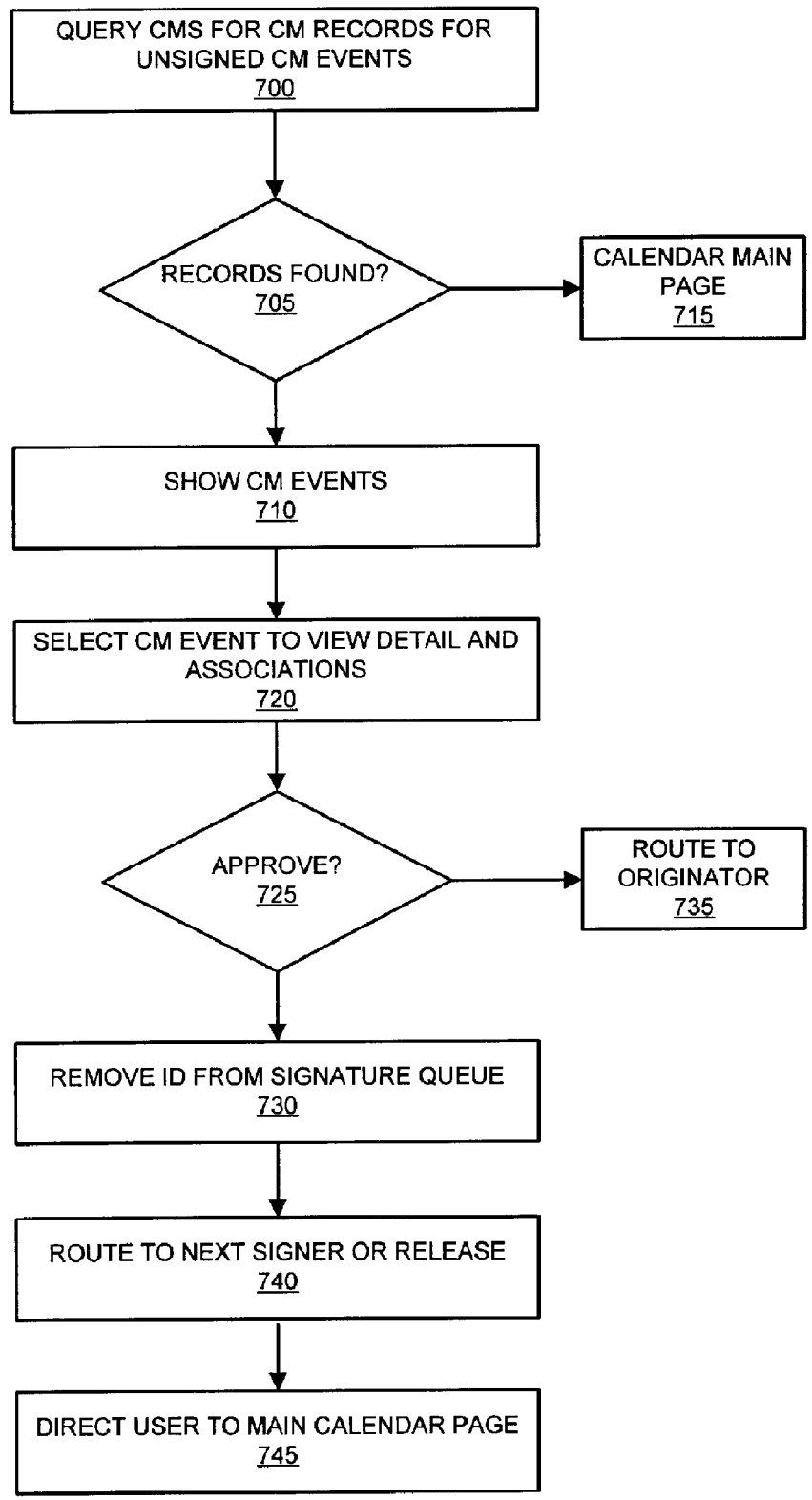

FIG. 7 is a flow chart illustrating an exemplary process for authorizing a change management project and progressing it along a signature queue. From a CMS participants 100 calendar view, CMS 110 may display any change management project which may require review and approval from CMS participant 100. As previously discussed, business rules within CMS 110 may determine whether a change management project requires signature approval and which CMS participants 100 need to sign. After entering authentication credentials to sign-on to CMS 110, CMS database 140 may be queried using CMS participant's 100 personal identifier. Practitioners will appreciate that a personal identifier may be CMS participant's 100 user ID, or a foreign key stored in a user database.

If a query does not return any records (step 705), then CMS participant 100 may be presented with a calendar main window (step 715). However, if one or more records are returned as a result of the query, then a short summary of each change management project may be presented to CMS participant 100 within a webpage (step 710). To view a listed change management even in greater detail, CMS participant 100 may select a change management project to view. Details of the change management project along with links to its associations may be displayed within the same webpage or within a new webpage (step 720). Details relating to a change management project may include, for example, status information (i.e. pending, failed at QA, canceled, rejected, etc.). Details may also include a list of remaining required steps in order to allow an originator and/or any interested party to track the progress of a change management event.

When CMS participant 100 completes review of a selected change management event, CMS participant 100 may select a button or hyperlink to indicate whether or not they approve (step 725). If the reviewing CMS participant 100 does not approve, then remaining authorizers may be removed from the change management project database record and notification of the rejection may be sent via email to the originator (step 735). If CMS participant 100 approves, then the identification of CMS participant 100 may be removed from the change management project database record (step 730). In one embodiment, business rules may determine if one or more additional signatures are required. In a queue architecture, an approval from a CMS participant 100 may trigger business rules to add the next signer to the database record. If there are additional signers then the change management project may be routed to the next signer, or if all required signatures have been obtained, then the change management project may be released (step 740). Following CMS participant 100 approval or disapproval of a change management event, CMS participant 100 may be presented with the main calendar window where they may view another pending change management project or any other activity available through the calendar (step 745).

While not illustrated, the invention further contemplates a group signoff and deployment process to ensure a change management package is functioning correctly. In one embodiment, a change management package may use a software delivery tool which may load a script to a computer. The script may contain information retrieved from the sealed implementation package. The software delivery tool may then load an executable component to one or more servers simultaneously within a production environment. A independent group of users may view and validate via a client browser to ensure that all changes are functioning correctly. Upon successful completion of validation, each member of the group may use the CMS 110 to signoff thus allowing the code to remain in the production environment.

The invention as described above provides for start to finish semi-automated management of change management requests. Practitioners will appreciate that the system as described may comprise any number of system components and process steps without affecting the scope of the invention. Additional steps may be added and functionality may be automated through implementation of additional business rules. The system may be scaleable, in that additional automation routines and functionality may be added without departing from the scope of the invention Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. Further, no element described herein is required for the practice of the invention unless expressly described as "essential"or" critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. An information management apparatus comprising a microprocessor and a memory storing a program executable by said microprocessor, wherein said program includes computer code for implementing a method for facilitating management of change management projects, and wherein said method includes steps of:
    receiving, from a user, a request to access change management data, wherein said change management data includes information relating to one or more change events;
    formatting said change management data based on at least one of predetermined parameters and parameters specified by said user, including formatting said change management data to show dependencies between said one or more change events;
    transmitting said change management data over a network;
    causing said change management data to be viewed by said user via a client browser; and
    permitting said user, if said user is authorized, to modify at least one of said change management data and associations related to said change management data.

2. The apparatus of claim 1, wherein said step of formatting said change management data includes formatting said change management data within at least one calendar.

3. The apparatus of claim 1, wherein said step of causing said change management data to be viewed by said user via said client browser includes causing only a portion of said change management data to be viewed by said user, wherein said portion of said change management data relates to a group of which said user is a member.

4. The apparatus of claim 1, wherein said method further includes a step of generating reports from said change management data.

5. The apparatus of claim 1, wherein said method further includes a step of authorizing modifications to said change management data.

6. The apparatus of claim 1, wherein said method further includes step of:
    transferring said change management data from a first computer into a file on a second computer, wherein said change management data includes at least one of files and said information relating to said one or more change events; and
    retrieving said change management data from said file and loading said change management data into a database.

7. The apparatus of claim 6, wherein said transferring step includes transferring automatically at defined intervals.

8. The apparatus of claim 1, wherein said step of formatting includes obtaining details relating to said change management data.

9. The apparatus of claim 1, wherein said step of formatting includes obtaining details relating to said change management data, wherein said details include at least one of status information and remaining required steps for tracking a progress of said change management project.

10. The apparatus of claim 1, wherein said method further includes a step of providing reports of change management information.

11. The apparatus of claim 1, wherein said method further includes a step of invoking business rules to develop substantially consistent descriptions related to said change management project.

12. A computer-readable storage medium storing computer-executable code that, when executed by a computer, causes the computer to implement a method for facilitating management of change management projects, wherein said method comprises steps of:
    transferring change management data from a first computer into a file on a second computer, wherein said change management data includes information relating to one or more change events;
    retrieving said change management data from said file and loading said change management data into a database;
    receiving a request, from a user, to access said change management data;
    formatting said change management data based on at least one of predetermined parameters and parameters specified by said user, including formatting said change management data to show dependencies between said one or more change events;
    transmitting said change management data over a network;
    causing said change management data to be viewed by said user via a client browser; and
    permitting said user, if said user is authorized, to modify at least one of said change management data and associations related to said change management data.

13. The apparatus of claim 1, wherein said method further includes a step of calculating statistics pertaining to said change management data.

14. An information management system for facilitating management of change management projects, said system comprising at least one processor programmed to:

receive, from a user, a request to access change management data, wherein said change management data includes information relating to one or more change events;

format said change management data based on at least one of predetermined parameters and parameters specified by said user, including formatting said change management data to show dependencies between said one or more change events;

transmit said change management data over a network;

cause said change management data to be viewed by said user via a client browser; and permit said user, if said user is authorized, to modify at least one of said change management data and associations related to said change management data.

* * * * *

UNITED STATES PATENT AND TRADEMARK OFFICE
CERTIFICATE OF CORRECTION

| | | |
|---|---|---|
| PATENT NO. | : 7,574,483 B1 | Page 1 of 3 |
| APPLICATION NO. | : 10/905201 | |
| DATED | : August 11, 2009 | |
| INVENTOR(S) | : James Alger et al. | |

It is certified that error appears in the above-identified patent and that said Letters Patent is hereby corrected as shown below:

<u>Title page, item [75] INVENTOR</u>

"Frank J. Gvalos, Ft. Lauderdale, FL (US)" should read --Frank J. Gyalos, Ft. Lauderdale, FL (US)--.

<u>SHEET 2</u>

Fig. 2, "LOGS IN SELECTS" should read --LOGS IN, SELECTS--.

<u>COLUMN 1</u>

Line 27, "modify" should read --to modify--.
    Line 59, "project that" should read --project in which--.

<u>COLUMN 4</u>

Line 1, "order better" should read --order to better--.
    Line 16, "activities" should read --activity--.

<u>COLUMN 5</u>

Line 28, "workgroup," should read --workgroup--.

<u>COLUMN 7</u>

Line 44, "computers. user" should read --computers. User--.

<u>COLUMN 9</u>

Line 40, "the same of" should read --the same or--.

<u>COLUMN 10</u>

Line 19, "comprise in" should read --be comprised of--.
    Line 32, "may be presented a web form" should read --may be presented with a web form--.
    Line 37, "a employee" should read --an employee--.

UNITED STATES PATENT AND TRADEMARK OFFICE
CERTIFICATE OF CORRECTION

PATENT NO.       : 7,574,483 B1
APPLICATION NO.  : 10/905201
DATED            : August 11, 2009
INVENTOR(S)      : James Alger et al.

It is certified that error appears in the above-identified patent and that said Letters Patent is hereby corrected as shown below:

COLUMN 12

Line 11, "of a holistic" should read --or a holistic--.
    Line 14, "invention," should read --invention--.
    Line 21, "tool" should read --tools--.
    Line 32, "may been" should read --may be--.
    Line 46, "inter dependencies" should read --interdependencies--.

COLUMN 14

Line 41, "perform" should be deleted.

COLUMN 15

Line 7, "where made" should read --were made--.
    Line 10, "member" should read --members--.
    Line 18, "may be presented" should read --the participant may be presented--.
    Line 53, "are obtains." should read --are obtained.--.

COLUMN 16

Line 10, "participants" should read --participant's--.
    Line 40, "they approve" should read --participant approves--.
    Line 58, "where they" should read --where participant--.

UNITED STATES PATENT AND TRADEMARK OFFICE
CERTIFICATE OF CORRECTION

PATENT NO. : 7,574,483 B1
APPLICATION NO. : 10/905201
DATED : August 11, 2009
INVENTOR(S) : James Alger et al.

It is certified that error appears in the above-identified patent and that said Letters Patent is hereby corrected as shown below:

<u>COLUMN 17</u>

Line 2, "A indepen-" should read --An indepen--.
    Line 6, "signoff" should read --sign off,--.
    Line 17, "invention" should read --invention.--.
    Line 26, ""essential"or" critical"." should read --"essential" or "critical".--.

<u>COLUMN 18</u>

Line 11, "step of:" should read --steps of:--.

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,574,483 B1 | Page 1 of 2 |
| APPLICATION NO. | : 10/905201 | |
| DATED | : August 11, 2009 | |
| INVENTOR(S) | : James Alger et al. | |

It is certified that error appears in the above-identified patent and that said Letters Patent is hereby corrected as shown below:

<u>Title page, item [75] INVENTOR</u>

"Frank J. Gvalog, Ft. Lauderdale, FL (US)" should read --Frank J. Gyalog, Ft. Lauderdale, FL (US)--.

<u>SHEET 2</u>

Fig. 2, "LOGS IN SELECTS" should read --LOGS IN, SELECTS--.

<u>COLUMN 1</u>

Line 27, "modify" should read --to modify--.
Line 59, "project that" should read --project in which--.

<u>COLUMN 4</u>

Line 1, "order better" should read --order to better--.
Line 16, "activities" should read --activity--.

<u>COLUMN 5</u>

Line 28, "workgroup," should read --workgroup--.

<u>COLUMN 7</u>

Line 44, "computers. user" should read --computers. User--.

This certificate supersedes the Certificate of Correction issued October 20, 2009.

Signed and Sealed this
Ninth Day of October, 2012

David J. Kappos
*Director of the United States Patent and Trademark Office*

CERTIFICATE OF CORRECTION (continued)
U.S. Pat. No. 7,574,483 B1

COLUMN 9

Line 40, "the same of" should read --the same or--.

COLUMN 10

Line 19, "comprise in" should read --be comprised of--.
Line 32, "may be presented a web form" should read --may be presented with a web form--.
Line 37, "a employee" should read --an employee--.

COLUMN 12

Line 11, "of a holistic" should read --or a holistic--.
Line 14, "invention," should read --invention--.
Line 21, "tool" should read --tools--.
Line 32, "may been" should read --may be--.
Line 46, "inter dependencies" should read --interdependencies--.

COLUMN 14

Line 41, "perform" should be deleted.

COLUMN 15

Line 7, "where made" should read --were made--.
Line 10, "member" should read --members--.
Line 18, "may be presented" should read --the participant may be presented--.
Line 53, "are obtains." should read --are obtained.--.

COLUMN 16

Line 10, "participants" should read --participant's--.
Line 40, "they approve" should read --participant approves--.
Line 58, "where they" should read --where participant--.

COLUMN 17

Line 2, "A indepen-" should read --An indepen--.
Line 6, "signoff" should read --sign off,--.
Line 17, "invention" should read --invention.--.
Line 26, ""essential"or" critical"." should read --"essential" or "critical".--.

COLUMN 18

Line 11, "step of:" should read --steps of:--.